Sept. 22, 1970 A. E. RELATION 3,530,360
HIGH-SPEED PROTECTIVE MEANS FOR UNINTERRUPTIBLE POWER SYSTEMS
Filed May 31, 1968 3 Sheets-Sheet 1
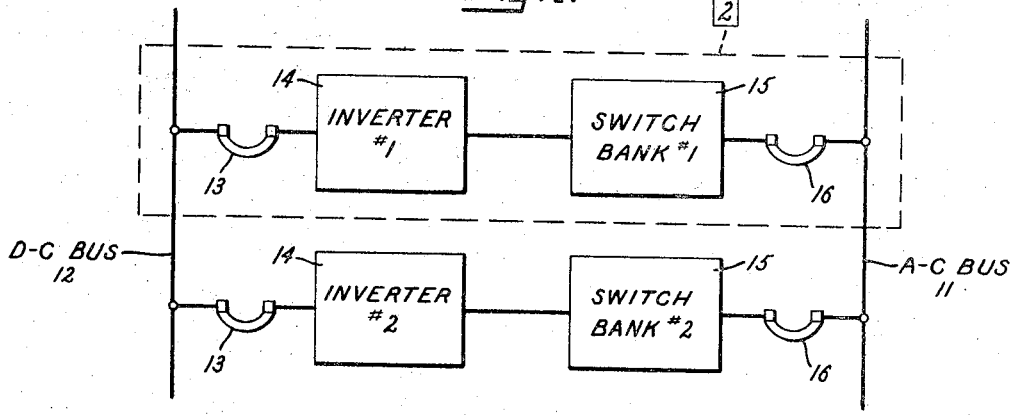
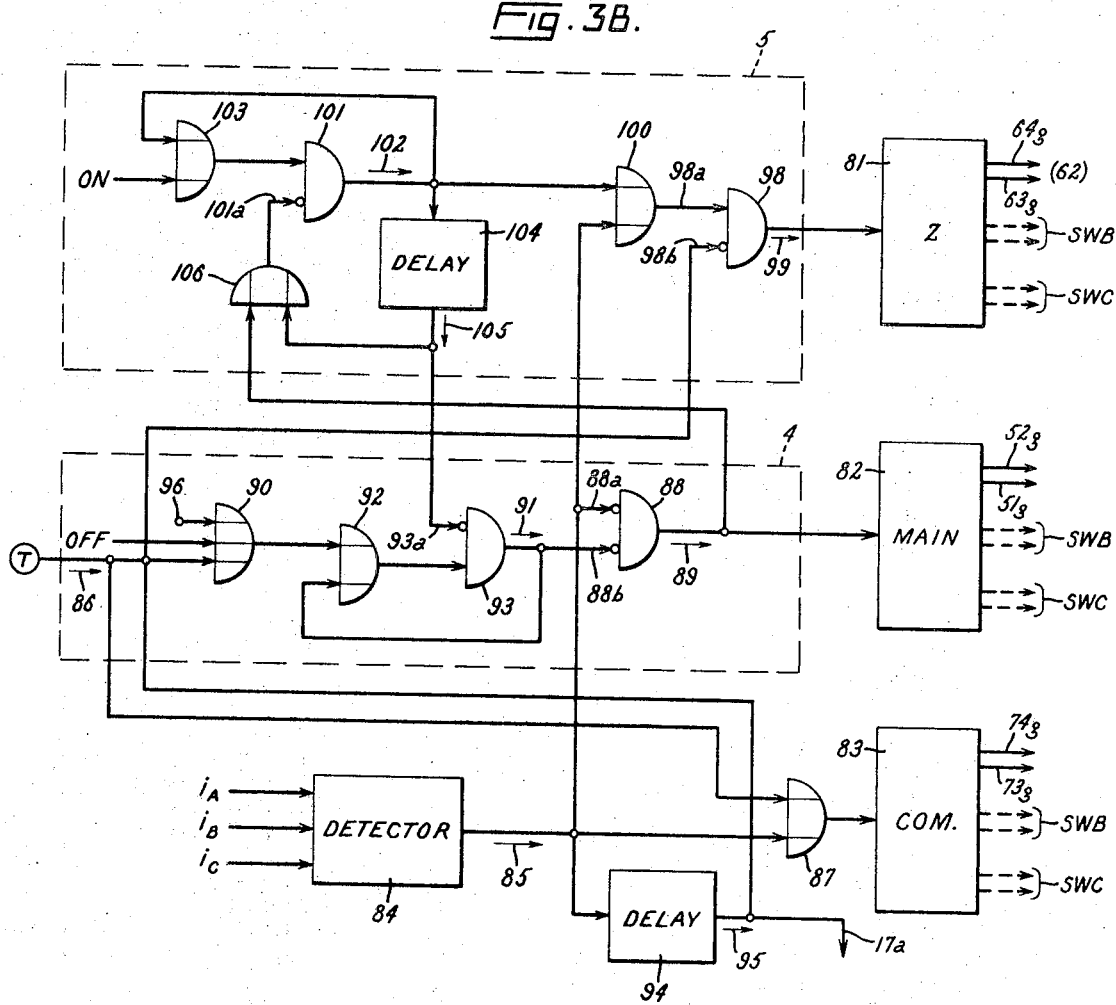
INVENTOR:
ALFRED E. RELATION,
BY Albert S. Richardson Jr.
ATTORNEY

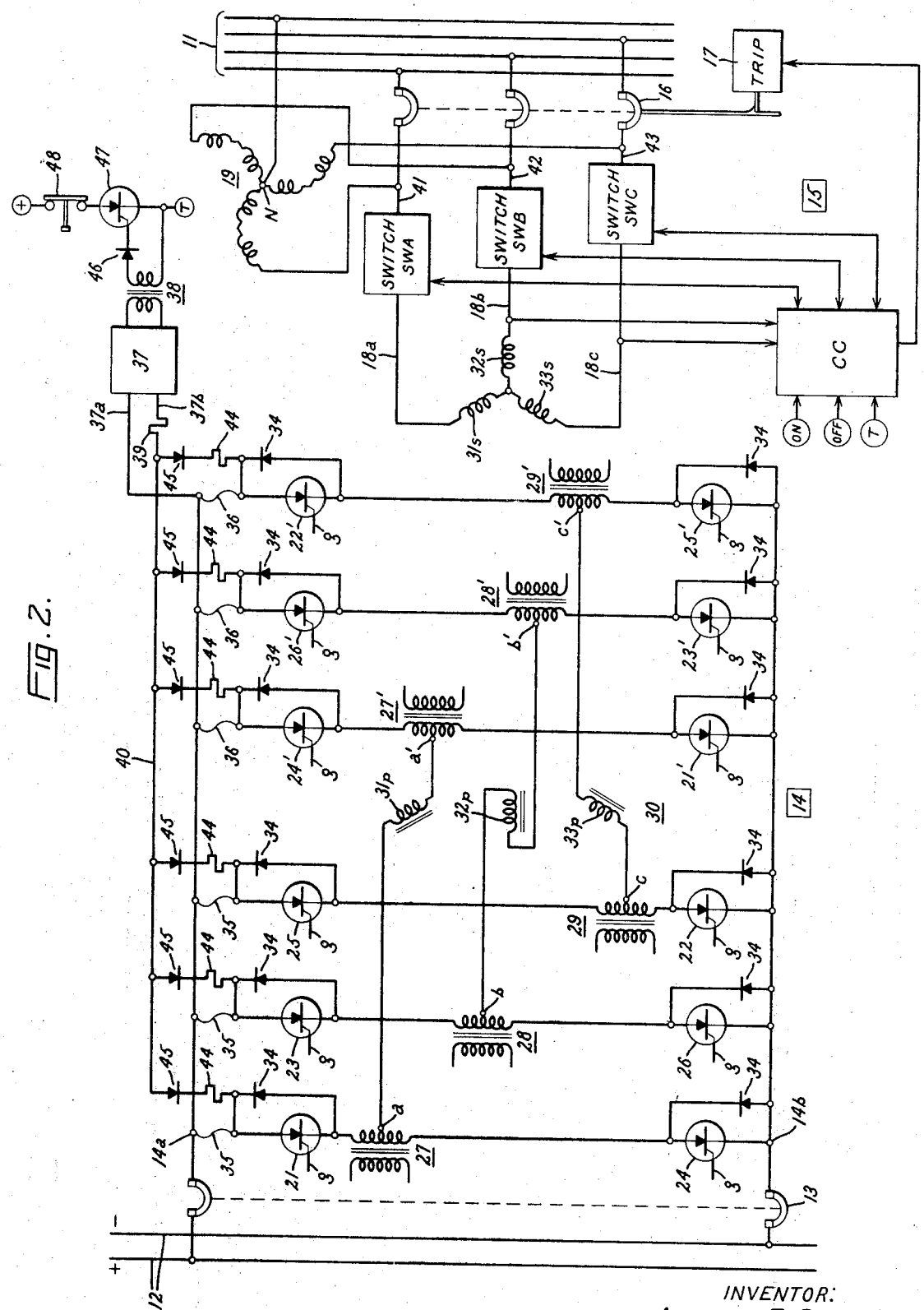

INVENTOR:
ALFRED E. RELATION,
BY Albert S. Richardson Jr.
ATTORNEY

United States Patent Office 3,530,360
Patented Sept. 22, 1970

3,530,360
HIGH-SPEED PROTECTIVE MEANS FOR
UNINTERRUPTIBLE POWER SYSTEMS
Alfred E. Relation, Merion Station, Pa., assignor to General Electric Company, a corporation of New York
Filed May 31, 1968, Ser. No. 733,446
Int. Cl. H02h 7/14
U.S. Cl. 321—5
10 Claims

ABSTRACT OF THE DISCLOSURE

A static inverter suitable for use with other redundant inverters for supplying uninterruptible power to a critical A-C bus is equipped with a malfunction detector for operating an isolating switch so fast that the failing inverter is removed from service before it can impair the integrity of the critical power bus. The isolating switch comprises a normally conducting current limiting circuit interrupter that is turned off in high-speed response to the detection of the first commutation failure in the inverter.

This invention relates to means for protecting electric power distribution systems and circuits, and more particularly it relates to apparatus equipped with high-speed fault sensing and disconnecting means for minimizing disturbances on a critical power bus.

In the art of electric power distribution and protection, it is becoming increasingly important to minimize adverse effects of an abnormal condition in the source of power, in the distribution system itself, or in the electric loads supplied thereby so that critical loads can continue operating with the least possible disturbance. Reliable power can be essential for loads such as computers, for example, where even a transient dip in voltage, or momentary loss of power, can result in serious errors or malfunctions in the utilization equipment and an extended outage could be intolerable. Consequently, to improve the quality and continuity of electricity supplied to such loads, electrical manufacturers have made available "uninterruptible power systems," sometimes referred to as no-break power supplies, for installation between the incoming power lines and the load. Such apparatus typically comprises redundant combinations of rectifying, energy-storing, and inverting sections so arranged as to faithfully energize a critical bus with highly stable A.-C. power regardless of disturbances in or failure of utility power.

In practice the critical bus is often supplied by a plurality of inverters operating in parallel. If one of these inverters were to experience an abnormal or fault condition internally, it should be automatically isolated or disconnected from the system before the load circuit and other sources connected to the same bus are seriously disturbed. (The inverters are designed with sufficient reserve capacity so that the remaining sound ones can continue supply the load.) Consequently, high-speed sensing of an internal malfunction and disconnecting of the failing apparatus are desirable, and it is a general objective of my invention to provide improved means for accomplishing these ends.

A further objective of the invention is the provision of a novel combination of protective means for quickly isolating an inverter from its load circuit in response to an incipient fault therein.

In its high sensitivity and speed of response, my invention differs significantly from prior art practices such as the one disclosed in U.S. Patent 3,124,740—Corey et al.

In carrying out my invention in one form, a static inverter comprising a plurality of complementary pairs of alternately conducting solid-state controlled switching devices or valves is connected to a D.-C. source by means of a plurality of current-limiting fuses and to a live A.-C. output bus by means of a high-speed static circuit interrupter. The valves are so interconnected and arranged that normally current from the D-C source will serially traverse a first valve of one pair and a second valve of the complementary pair, and they are turned on and off in an appropriate sequence to convert the unipolarity source voltage to an alternating output voltage. The fuses are individually connected in series with corresponding first valves of the respective pairs, and they are subject to rupturing or blowing in the event of an abnormal overlap of the conducting periods of both valves of the associated pair, a fault condition that is commonly referred to as a "commutation failure." Thus a fuse quickly interrupts the D-C short circuit current that results from commutation failure. In addition, I provide means for initiating high-speed turn-off of the aforesaid static circuit interrupter in response to voltage increasing across any one of the fuses on the occasion of its blowing, whereby the inverter is immediately isolated from its load.

Ordinarily an internal inverter fault will not result in an untoward short circuit of its A.-C. output terminals so long as only a single commutation failure is involved. But the first such failure invariably precipitates a second one a short time later, and if the live output bus were not earlier disconnected the load circuit would then be adversely affected. The protective scheme summarized above is able to react so fast that a malfunctioning inverter is isolated from the output bus even before the second of two successive commutation failures occurs. In practice this scheme has been able to complete the isolating action in less than one millisecond following the first sign of trouble.

My invention will be better understood and its various objects and advantages will be more fully appreciated from the following description taken in conjunction with the accompanying drawings in which:

FIG. 1 is a one-line schematic diagram of a relevant portion of an uninterruptible power system in which my improved protective means is useful;

FIG. 2 is a schematic diagram of polyphase power apparatus which in FIG. 1 is represented by the components enclosed in the broken-line box;

FIG. 3b is a functional block diagram of a preferred embodiment of the controls shown as a single block in FIG. 3a.

Figure 3A:
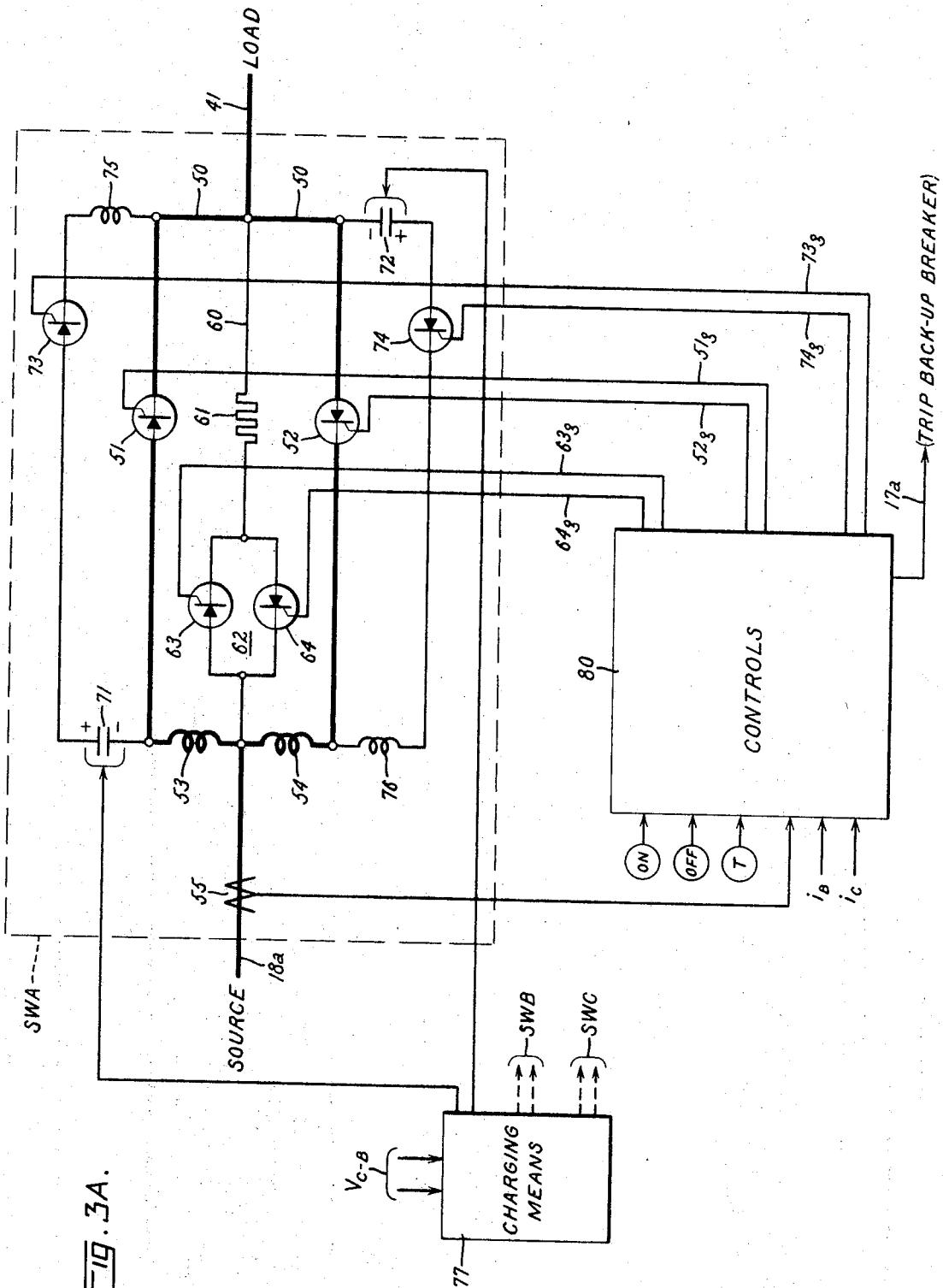
FIG. 3a is a schematic diagram of one of the switching means and associated control circuit shown in block form in FIG 2.

Referring now to FIG. 1, which is a simplified one-line schematic diagram of part of a typical uninterruptible power system, a critical A-C electric power bus 11 is seen connected to a D-C bus 12 by way of duplicate power apparatus each comprising the series combination of a D-C circuit breaker 13, an electric power converter 14 (labeled "inverter"), high-speed circuit interrupting means 15 (labeled "switch bank"), and a slower backup circuit breaker 16. The first of the redundant apparatus in FIG. 1 has been shown inside a broken-line box 2 and will soon be described in detail in conjunction with FIG. 2.

The D-C bus 12 serves as a dependable source of power for which purpose it is in turn connected to alternative sources (not shown) comprising, for example, a rectifier that is energized by power supplied by an electric utility, reliable short-term energy storing means such as a storage battery, and long-term emergency generating means such as a diesel generator. The A-C bus 11 is used to supply highly reliable, stable power to a critical A-C load circuit. The load circuit typically comprises a plurality of feeders or branches (not shown), each being connected to the bus 11 and being individually protected by suitable overload responsive means such as electric fuses.

The two inverters shown in FIG. 1 are designed to operate in parallel to convert unipolarity source voltage to alternating load voltage. Still more inverters or other A-C sources can be added to the system if desired. If any one of the inverters were to fail, the remaining sound ones will be able to keep the bus 11 alive and to supply the power requirements of the connected load without interruption, whereby a highly reliable system is insured. However, reliability is jeopardized if the failing inverter is not isolated from thet system before it results in an adverse dip or collapse of the A-C bus voltage and before it can cause a sympathetic failure in another parallel inverter. FIG. 2 shows my improved means for obtaining this end.

In FIG. 2 the D-C bus 12 of FIG. 1 is illustrated as a pair of relatively positive and negative conductors labeled by conventional plus and minus symbols. These conductors are adapted to be connected to a unipolarity voltage source as previously explained, and positive and negative input terminals 14a and 14b of the inverter 14 are respectively coupled thereto by a 2-pole electromechanical circuit breaker 13. In accordance with common practice, the inverter input terminals 14a and 14b are spanned by a D-C capacitor bank (not shown) to accommodate reactive energy that will be exchanged between the D-C and A-C ends of the inverter in operation.

For purposes of illustration, the A-C bus 11 has been shown in FIG. 2 as a 3-phase, 4-wire power distribution network which is intended to supply reliable power to whatever critical loads are connected thereto. The associated inverter 14 is therefore provided with a set of three A-C output conductors 18a, 18b, and 18c at which 3-phase alternating voltage is developed, and these conductors are respectively coupled to the first three wires of the bus 11 by means of load current conducting paths 41, 42, and 43 and a normally closed 3-pole electromechanical circuit breaker 16 that is equipped with conventional tripping means 17. In FIG. 2 the circuit interrupting means 15 that is provided for high-speed isolation of the inverter 14 from the bus 11 is represented as a bank of three identical switching means SWA, SWB, and SWC which are respectively connected in series with the paths 41, 42, and 43 and which share appurtenant control circuits CC. These switching means are normally turned on, in which state they enable alternating current to flow between the inverter 14 and the bus 11. A zig-zag grounded transformer 19 or the like is connected to the paths 41, 42, and 43 between the circuit interrupter 15 and the back-up breaker 16, and the neutral N of this transformer is directly connected to the fourth wire of the bus 11. In practice appropriate filtering or power factor correcting capacitors (not shown) are ordinarily connected either in shunt with the paths 41, 42, and 43 or across the inverter output conductors 18a, 18b, and 18c as desired.

In the static inverter 14 shown in FIG. 2 the D-C input terminals 14a, 14b and the A-C output conductors 18a, 18b, 18c are interconnected by means of a 3-phase power transformer 30 and a plurality of complementary pairs of alternately conducting solid-state controlled switching devices or valves commonly known in the art as silicon controlled rectifiers (SCR's) or thyristors. By "complementary pairs" I mean that normally current from the D-C source serially traverses a first thyristor of one of the pairs and a second thyristor of the other. By "alternately conducting" I mean that normally the conducting or turned on periods of the respective thyristors are mutually exclusive. As shown in FIG. 2, both thyristors of each pair have been connected in series and poled in agreement with each other between the input terminals 14a and 14b, and the junctures of the thyristors forming complementary pairs are respectivetly spanned by the primary windings of the transformer 30.

More specifically, the thyristors of the inverter 14 are arranged to form between the input terminals 14a and 14b three separate full-wave bridges that respectively control bi-directional current in the transformer primary windings 31p, 32p, and 33p. Corresponding secondary windings 31s, 32s, and 33s of the transformer 30 are connected in a star configuration to the output conductors 18a, 18b, and 18c, respectively.

The first bridge comprises a first pair of master thyristors 21 and 24 and a complementary pair of slave thyristors 24' and 21'. A center tapped winding of a commutating interval current limiting reactor 27 is connected between the cathode of the first master thyristor 21 and the anode of the second master thyristor 24, a center tapped winding of a similar reactors 27' is connected between the cathode of the first slave thyristor 24' and the anode of the second slave thyristor 21', and the respective center taps $a$ and $a'$ of these windings are interconnected by the transformer primary winding 31p. The second fullwave bridge is formed by similarly connecting center tapped windings of two reactors 28 and 28' between first and second master thyristors 23, 26 and first and second slave thyristors 26' and 23', respectively, with the center taps $b$ and $b'$ being spanned by transformer primary winding 32p. The third bridge is formed by similarly interconnecting a first pair of master thyristors 25 and 22, a complementary pair of slave thyristors 22' and 25', two reactors 29 and 29' having center taps $c$ and $c'$, and transformer primary winding 33p.

Each of the thyristors shown in FIG. 2 is provided with a gate lead $g$ which receives an appropriate firing signal to trigger the corresponding thyristor, and each is shunted by a bypass diode 34 in inverse parallel relationship therewith. Each thyristor will commence conducting (turns on) in response to the concurrence of a firing signal applied to its gate and forward bias voltage impressed across its anode and cathode. To turn off a conducting thyristor, its anode current must be reduced below a predetermined small holding level, and this is done in a controlled manner by providing suitable commutating means (not shown). There are many well known commutating mechanisms for quenching anode current in a conducting thyristor. See for example the description of impulse-commutated inverters in chapter 7 of the reference book PRINCIPLES OF INVERTER CIRCUITS by B. D. Bedford and R. G. Hoft (published in 1964 by John Wylie & Sons, New York). At present I prefer to use the improved complementary impulse commutating means that is the claimed subject matter of reissued Pat. Re. 26,342—Bedford.

Symmetrical 3-phase alternating voltage is developed at the inverter output conductors 18a, 18b, and 18c by applying uniformly staggered 180-degree firing signals to the gate leads of the respective thyristors shown in FIG. 2 so that the thyristors are cyclically triggered in numerical sequence. The frequency of the alternating voltage is dependent upon the timing of these firing signals. Gate pulse generating means suitable for this purpose are well known in the art and have been omitted in FIG. 2 for the sake of drawing simplicity.

When both the master and the slave thyristors 21 and 21' are concurrently turned on, it will be observed that the voltage across the D-C input terminals 14a and 14b of the inverter 14 is impressed across the transformer primary winding 31p with a first polarity (center tap $a$ positive), and when both the master and slave thyristors 24 and 24' are concurrently turned on the same voltage is impressed across the same winding with the opposite polarity (center tap $a$ negative). Hence the primary winding 31p is energized by a succession of rectangular shaped pulses of alternating-polarity voltage, each pulse having an amplitude that is approximately equal to the magnitude of the D-C input voltage and a width that is equal to the duration of concurrent conduction by a master thyristor (21 or 24) on its slave counterpart (21' or 24'). The pulse width will fall short of a full 180° by an angle corresponding to the amount of phase displacement between the slave firing signal and the master firing signal.

The primary windings 32p and 33p of the transformer 30 are respectively energized by similar rectangular wave form alternating voltages that lag the voltage on winding 31p by 120 degrees and by 240 degrees, respectively. Consequently the unipolarity voltage applied to the input terminals of the inverter is converted into a symmetrical 3-phase alternating voltage at the output conductors 18a, 18b, and 18c. While this output voltage contains some fifth and higher harmonics, its fundamental sine wave component is predominant. The magnitude of the output voltage is controlled or regulated by delaying the firing signals for the slave thyristors with respect to the firing signals for the correspondingly numbered master thyristor, thereby varying the time interval between triggering each main thyristor and turning on the slave thyristor that succeeds it in the associated bridge. Such pulse width voltage control is well known in the art (e.g., see chapter 8 of the above-cited Bedford and Hoft reference book).

From the foregoing description of the inverter 14 it will be apparent that the 180-degree firing signal for the first thyristor of each pair of alternately conducting thyristors shown in FIG. 2 is diametrically out-of-phase with respect to the similar firing signal for the second thyristor of the same pair, and the periods during which the two thyristors can respectively conduct are intended to be mutually exclusive. For example, when the firing signal for thyristor 21 commences in its proper turn, the firing signal for the companion thyristor 24 expires, and vice versa. Actually, it complementary impulses commutation is used, the conducting periods for the paired thyristors 21 and 24 will normally overlap for brief intervals, referred to as the commutating intervals, since each conducting thyristor is relieved or turned off as a result of turning on the other. The reactor 27 located at the juncture of the two thyristors limits D-C source current during these intervals.

Inverters are not perfect machines and malfunctions are possible. One expectable malfunction is commonly known as commutation failure, whereby a relieved or outgoing thyristor does not turn off when it should. This may be the result of a component failure or of excessive load current at the moment commutation is attempted. In any event, a single commutation failure will cause an abnormal overlap of the conducting periods of the paired thyristors (usually a master pair), whereupon the associated commutating interval current limiting reactor quickly saturates (e.g., in less than 200 microseconds) and the inverter input terminals 14a and 14b are consequently shunted by a low impedance path that conducts high short circuit current from the D-C source (sometimes referred to as D-C shoot through current). To safely interrupt this fault current, the inverter 14 is fused by current limiting fuses that will now be described.

As is clearly shown in FIG. 2, a plurality of fuses 35 and 36 have been respectively connected in series with the first thyristors of the several complementary pairs. Thus a fuse 35 is connected between the positive input terminal 14a and the anode of the first thyristor 21 of a master pair, while a similar fuse 36 is connected between the same input terminal and the anode of the first thyristor 24' of the complementary slave pair. Any one of these fuses is subject to blowing when the magnitude of its through current increases abnormally as a result of a commutation failure involving the thyristor pair with which it is associated. Fast acting, current limiting fuses well suited for this purpose are available in the trade. Typically each fuse comprises a fusible element or link of such material (e.g., silver) and physical construction and disposed in such an environment that it melts or ruptures in substantially instantaneous response to the inception of fault current, thereby creating an electric arc inside the fuse, whereupon arc voltage appreciably higher than the source voltage is generated and the arc is rapidly extinguished before the fault current has time to reach a dangerously high value. In this manner the D-C shoot through current is interrupted and the culpable pair of thyristors is isolated from the positive input terminal 14a without further damage to the inverter and without seriously disturbing the source.

In the above-described inverter, the first commutation failure is most likely to occur in a master pair of thyristors, and ordinarily it will not have an immediately adverse affect on the voltage of the critical load bus 11 to which the A-C output conductors of the inverter are connected. But because of the first commutation failure, the second thyristor of the involved pair will conduct for an abnormally long period of time, and the resulting increase in load current virtually assures an additional commutation failure in the complementary (slave) pair when the first thyristor in that pair is next due to be turned off. As a consequence of the second commutation failure, a primary winding of the transformer 30 will saturate and the internal impedance of the inverter, as viewed from its A-C output conductors, abruptly decreases. If the faulted inverter is not then isolated from the critical A-C bus 11, short circuit current could begin flowing from the bus through the inverter, and this condition is intolerable because of its adverse affect on bus voltage and on the operation of other parallel inverters. I avoid such a condition by providing the extremely fast current limiting interrupter 15 in the circuit connecting the inverter output conductors 18a, 18b, 18c to the bus 11 and by providing means for initiating turn-off of the interrupter 15 in high-speed response to the first commutation failure.

For this purpose the apparatus illustrated in FIG. 2 includes means for detecting the blowing of any one of the fuses 35 and 36 and for producing a tripping signal in high-speed response thereto. Preferably this means comprises a voltage sensing circuit 37 (shown in block form) that is suitably designed to energize a pulse transformer 38 whenever a voltage above a predetermined low threshold level is applied across its input leads 37a and 37b. One of the input leads 37a for the sensor 37 is directly connected to the fuse terminals that are connected in common to the positive input terminal 14a of the inverter. The other input lead 37b is connected via a resistor 39 to a bus 40 that is connected in turn to the opposite terminals of the respective fuses 35, 36 by individual isolating circuits each comprising a resistor 44 in series with a diode 45. Normally there is negligible potential difference between the input leads 37a and 37b. But on the occasion of a fuse blowing, the voltage drop across it abruptly increases and as a result the potential of the lead 37b will become appreciably negative with respect to 37a. This activates the sensor 37 which responds by energizing the transformer 38.

The output winding of the pulse transformer 38 supplies a firing signal through a diode 46 to the gate of a thyristor 47 to which it is connected as shown. The anode of the thyristor 47 is connected through a normally closed reset contact 48 to a relatively positive terminal of a suitable control power supply, and the cathode of this thyristor is connected, by way of a conduit T, to a current responsive element and a negative control power terminal inside the control circuits CC of the interrupter 15. Whenever the voltage sensor 37 is activated, the thyristor 47 turns on and conducts anode current which continues until the reset contact 48 is subsequently opened. This anode current comprises the aforesaid tripping signal for circuit interrupter 15, and it appears within 50 microseconds of the fuse voltage increase.

The circuit interrupter 15 and its control circuit are designed for high speed, current limiting turn off of the respective switching means SWA, SWB, and SWC in immediate response to receipt of the tripping signal T. Preferably, as is illustrated in FIG. 3A, static switching means are used.

FIG. 3A shows details of the power circuit comprising one of the switching means SWA, and the other two switches SWB and SWC are substantially the same. Although not essential for practicing my invention, I have shown a novel multipurpose switch capable of operating in either a high-speed isolating mode or an impedance inserting mode, which is the claimed subject matter of a copending patent application Ser. No. 733,150 for A. N. Greenwood and assigned to the General Electric Company. In this switch there is a main circuit 50 comprising load current conducting solid-state controlled switching means, and a parallel subsidiary circuit 60 comprising the combination of another switching means in series with current limiting impedance means 61. The solid-state controlled switching means of the main circuit 50 is normally maintained in a relatively low resistance, turned-on state, whereby load current can easily traverse the switch. Preferably this switching means comprises first and second thyristors 51 and 52 disposed in inverse parallel relationship with one another as shown. The main thyristors are turned on (triggered) by means of suitable firing signals supplied thereto from associated controls 80 via connections 51g and 52g, respectively. Further details of the controls 80 are illustrated in FIG. 3B which will be described later.

If desired for higher current and voltage ratings of the switch, duplicate devices can be connected in parallel and series and operated in unison with the thyristors 51 and 52, respectively. The main thyristors are selected to safely conduct their respective shares of full load current continuously.

Preferably the main circuit 50 of the switch SWA also includes a pair of decoupling inductors 53 and 54 which are respectively connected in series with the thyristors 51 and 52. The inductor 53 is located between the anode of thyristor 51 and the source end of the switch, and the inductor 54 is located between the cathode of thyristor 52 and the same end of the switch.

The switching means 62 in the subsidiary circuit 60 of SWA can be either an electromechanical contact or a solid-state controlled switching means which preferably exhibits bidirectionally conducting capability. As is shown in FIG. 3A, it comprises a pair of thyristors 63 and 64 connected in inverse parallel relationship with one another. The on/off states of these thyristors are controlled by firing signals respectively supplied thereto from the controls 80 via connections 63g and 64g. Since the thyristors 63, 64 are in series with the current limiting impedance means 61 (preferably a resistor), and since they are not required to conduct for more than a predetermined limited length of time (see below), they can have an appreciably lower thermal rating (and hence smaller size and lower cost) than the thyristors in the main circuit 50. Preferably the resistance value of the resistor 61 is selected to limit the current that can traverse the switch, when the main thyristors 51 and 52 are both turned off and when the whole load is short-circuited, to a magnitude approximately equal to 100 percent normal full load current.

To sense the magnitude of current in the load current path 41, the illustrated switch includes a current transformer 55 which supplies a proportional input signal to the controls 80. The controls are designed to initiate an extremely fast transfer of through current from the main circuit 50 to the subsidiary circuit 60 in immediate response to the occurrence of any load fault condition that causes abnormally high current in the main circuit, as reflected by the current transformer 55. If the resulting transfer is quick enough, the resistor 61 can impede any appreciable rise in current above the pickup level and will in fact limit current to its 100 percent value, whereby the associated inverter 14 can continue operating without shut down or damage and service continuity is at least temporarily preserved.

In order to accomplish this result, the switch SWA includes means, operative when commanded by its controls 80, for immediately forcing the main thyristors 51, 52 to change abruptly from their low resistance, turned on states to high-resistance, turned off states. Such action requires that anode current in any conducting thyristor be quenched and its firing signal be discontinued (suppressed) without waiting for the next natural current zero. To quench current in a conducting thyristor, suitable commutating means is connected to the main thyristors 51 and 52.

The commutating means, which can take a variety of forms well known in the art, preferably comprises first and second capacitor-thyristor circuits respectively connected in parallel with the main thyristors 51 and 52 to divert current from the latter when the corresponding commutating thyristor is triggered, whereby both of the main thyristors can immediately assume a high resistance, essentially nonconducting state. Thus, as is clearly shown in FIG. 3A, the series combination of a power capacitor 71, a commutating thyristor 73, and a small reactor 75 is connected across the main thyristor 51, and a similar combination of a power capacitor 72 in series with a commutating thyristor 74 and a small reactor 76 is connected across the main thyristor 52. In accordance with the teachings of U.S. Pat. No. 3,098,949—Goldberg, each of the power capacitors 71 and 72 is precharged to a suitable D-C level by suitable charging means 77 which is energized by voltage $V_{C-B}$ derived from the inverter output conductors 18b and 18c. (The same charging means 77 can be used for precharging corresponding capacitors in the commutating means of the companion switches SWB nad SWC.) The relative polarity of the charge on each of the capacitors 71 and 72 has been indicated on FIG. 3A. The commutating thyristors 73 and 74 are triggered by firing signals supplied thereto from the controls 80 via connections 73g and 74g, respectively.

Although omitted in the drawings, it will be understood the conventional snubber circuits would ordinarily be connected in parallel with each of the power thyristors shown in FIGS. 2 and 3A to limit the rate of voltage rise across the thyristor when turning off.

Before proceeding with a description of FIG. 3B, the various operating modes of the multipurpose switch SWA shown in FIG. 3A will be summarized. Normally the thyristors 51, 52 in the main circuit 50 are turned on and alternating current freely traverses the same. The controls 80 are arranged to automatically respond to a condition of abnormally high current in the switch by supplying firing pulses to the commutating thyristors 73, 74. As a result, overcurrent is commutated from whichever main thyristor was conducting to the power capacitor in parallel therewith, and both of the main thyristors 51, 52 are quickly turned off. Substantially simultaneously the firing signals for the main thyristors are suppressed, which can be done either in automatic response to the commutating action or by suitably programing the controls 80. At this time the switching means 62 in the subsidiary circuit is turned on, whereby the current limiting resistor 61 is effectively connected in parallel with the main circuit 50. As soon as the capacitor in the commutating circuit discharges and current through the commutating thyristor oscillates to zero, the latter reverts to its high resistance, turned off state and current flowing through the switch is forced to traverse the current limiting resistor 61. The time required to detect the overcurrent condition and to complete the impedance inserting action is measured in microseconds. As a result, the inverter 14 is able to continue operating safely in the event of an external fault, thereby affording an opportunity for the faulted branch of the load circuit to be preferentially cleared by its own protective means.

The controls 80 are also arranged to suppress the firing signals for the switching means 62 in series with the current limiting resistor 61 and to initiate opening of the back-up breaker 16 in response to the abnormally high current condition continuing for a predetermined length of time (e.g., three seconds), whereupon the switching means 62 turns off to interrupt current through the resistor 61, and the load circuit is completely isolated from the inverter. However, if prior to the expiration of this interval the downstream protective means operates (e.g., a branch fuse blows) or the fault is otherwise selectively cleared, so that the abnormally high current condition terminates, the switch will automatically return to its normal state. Termination of the abnormal condition is indicated by current in the load path 41 subsiding to a predetermined "drop-out" value which may, for example, be 50 percent of the pickup level. This subsidence of current is sensed by current transformer 55, and the controls 80 respond thereto by restoring the firing signals for the main thyristors 51 and 52 which can then resume their normal low resistance, turned on states.

In a manner that will soon be explained in greater detail, the controls 80 are arranged simultaneously to trigger the commutating thyristor 73, 74 and to suppress the firing signals for both the main thyristors 51, 52 and the switching means 62 in high-speed response to the receipt of the tripping signal T that is supplied by my commutation failure detecting means, whereby the inverter is immediately isolated from its load circuit in the event of an incipient internal fault that ultimately could adversely disturb the critical load bus. At this time, in the interest of safety, the controls 80 will also initiate opening of the electromechanical back-up circuit breaker 16 by actuating its tripping means 17 via connection 17a, whereby the switch bank 15 itself is isolated from the live bus 11.

In order to restart or reclose a turned-off switch SWA, the switching means 62 is first triggered, thereby inserting the resistor 61 in series with the load current path 41, and subsequently the main thyristors 51 and 52 are triggered into their conducting states. This operating sequence serves several useful purposes. While the resistor 61 is effective, it limits the magnitude of inrush current to the grounding transformer 19 and to any other active impedance elements that are connected to the grounding transformer 19 and to any other active impedance elements that are connected to the path 41, thereby providing a soft start and avoiding unnecessary opening of the switch in response to only a transient overcurrent condition. The delay in triggering the main thyristors 51, 52 provides time for precharging the commutating capacitor 71 and 72, and if there is a pre-existing load fault the firing signals for the main thyristors will remain suppressed.

Turning now to FIG. 3B, there is shown a functional block diagram of switch control details that can be used in practice. In a copending patent application Ser. No. 738,611 for F. L. Steen and assigned to the General Electric Co., additional details of the controls are disclosed and certain novel features thereof are claimed. As can be seen in FIG. 3B, the controls 80 include blocks 81, 82, and 83 which are labeled "Z," "main," and "com," respectively, and which represent firing signal generators for triggering the switching means 62, the main thyristors 51, 52, and the commutating thyristors 73, 74 of the switch shown in FIG. 3A. The internal circuits of the respective generators 81, 82, and 83 can be conventional, and there is therefore no need to disclose them in detail herein.

The generator 83 is operative to produce one short (e.g., 20 microseconds) pulse-like firing signal for each of the commutating thyristors 73, 74 in SWA and in both of the companion switches SWB and SWC when it is triggered by an impedance inserting command from an overcurrent detector 84. Three input signals to the detector 84 are noted in FIG. 3B as $i_A$, $i_B$, and $i_C$, and they are respectively derived from the previously mentioned current transformer 55 and corresponding transformers in the other switches SWB and SWC. These input signals are therefore proportional in magnitude to the currents actually flowing through the respective poles or phases of the circuit interrupting means 15. The detector 84 is designed to produce an output signal 85 in substantially instantaneous response to any input signal attaining a preset pickup level which represents a predetermined value of overcurrent in the load circuit supplied by the switch (e.g., 125% rated full-load current). The detector will then sustain its output signal 85 until load current subsequently subsides to another, lower predetermined value (e.g., 50% of the pickup value), whereupon the impedance inserting command terminates. The leading edge of the signal 85 triggers the firing signal generator 83.

Alternatively, the generator 83 is activated by the tripping signal T. In FIG. 3B this turn off command is indicated by the arrow 86 which represents anode current of the thyristor 47 previously described. The two signals 85 and 86 are fed to the generator 83 via a conventional OR logic circuit 87. The generator 83 will produce firing signals for substantially simultaneously turning on both commutating thyristors 73, 74 in high-speed response to the issuance of either command. Turning on the commutating thyristors immediately commutates off whichever main thyristor 51, 52 is then conducting. Where desired, additional control circuitry (not shown) could be used to provide selective triggering of the two thyristors 73 and 74 in the respective switches SWA, SWB, and SWC, whereby only those associated with then conducting main thyristors are triggered upon operation of the generator 83.

The main firing signal generator 82 is operative when enabled to produce suitable firing signals for triggering both of the main thyristors 51 and 52 in each of the respective switches SWA, SWB, and SWC. It is controlled by logic means 4 so arranged that the generator 82 is normally enabled, whereby all of the main thyristors 51 and 52 are normally maintained in their turned on states. The logic symbol shown at 88 represents an AND function having two NOT inputs 88a and 88b. So long as there is no signal applied to either of these inputs, the logic component 88 will provide an output signal 89 that enables the generator 82 to operate. The output signal 89 is suppressed, thereby disabling the generator 82 and consequently suppressing the firing signals for the main thyristors 51, 52, in immediate response to an input signal at either 88a or 88b. The input 88a for the logic component 88 is energized by the output signal 85 from the overcurrent detector 84, whereby the generator 82 stops triggering the main thyristors at the same time the commutating thyristors are triggered by the impedance inserting command. The generator 82 will remain disabled and the main thyristors 51, 52 will remain off so long as the signal 85 subsists.

The other input 88b for the component 88 is energized by a signal 91 that is produced whenever any one of a plurality of alternative input pulses is supplied to an OR unit 90. In accordance with the above-cited Steen application, once the signal 91 appears it is maintained until the controls 80 are subsequently reset by a deliberate closing command. In FIG. 3B this latching function is shown symbolically by an OR component 92 and an AND component 93. When the unit 90 receives an input pulse, the AND component 93 produces the signal 91 and seals itself in until subsequently released by energization of its NOT input 93a.

Four possible inputs to the OR unit 90 are indicated in FIG. 3B. One is derived in delayed response to the operation of the overcurrent detector 84 by means of a timing circuit 94. The timing circuit 94 is designed to produce an output signal 95 when activated continuously by the signal 85 for a predetermined length of time (e.g., 3 seconds). The delayed signal 95 causes the second disabling signal 91 to appear, after which the main generator 82 will remain disabled even though the signal 85 is discontinued. It will now be apparent that whenever the external overload condition terminates before the aforesaid time interval expires, both the overcurrent detector 84 and the timing circuit 94 will immediately reset and no signal 95 will be produced, and in response to the termination of the overcurrent signal 85, the enabling signal 89 automatically returns to enable the generator 82 to resume triggering the main thyristors 51, 52.

Other inputs for the OR unit 90 are derived from the tripping signal 86, or from manually operated means indicated by the legend "off," or from any desired automatic inhibiting condition that results in a signal being applied to a terminal 96. Via appropriate amplifier and relay circuits (not shown), the tripping signal 86 is also used to energize the connection 17a and thereby actuate the tripping means 17 of the slower opening back-up breaker 16.

The block 81 in FIG. 3B represents suitable means for controlling the conductive state of the switching means 62 that is connected in series with the current limiting resistor 61 of the FIG. 3A switch. The means 81 is operative when active to produce an appropriate signal for turning on or closing the switching means 62 in all three switches SWA, SWB, and SWC. Where inverse parallel thyristors 63 and 64 are used, it can comprise a firing signal generator similar to the one shown at 82 for triggering the main thyristors. The generator 81 is itself controlled by logic means 5. To ensure high-speed isolation in response to the tripping signal 86, the logic means 5 has been arranged to render the generator 81 normally inactive, whereby the subsidiary thyristors 63 and 64 are normally maintained in their turned off states. This is accomplished by means of the AND logic component 98 having one regular input 98a and one NOT input 98b. Unless a signal is applied to the first input 98a and none to the second input 98b, no output signal 99 is provided by the component 98 and operation of the generator 81 is prevented or blocked.

The input 98a for the logic component 98 is energized via an OR logic circuit 100 by the output signal as from the overcurrent detector 84, whereby the generator 81 is activated and starts triggering the switching means 62 at the same time the commutating thyristors 73 and 74 are triggered by the impedance inserting command. Alternatively, the input 98a may be energized by a signal 102 that is produced by a logic component 101 on receipt of a switch closing command from means indicated by the legend "on." In any event, the output signal 99 of the logic component 98 is suppressed, thereby affirmatively deactivating the generator 81 and suppressing the firing signals for the switching means 62, whenever a signal is applied to its input 98b. The latter input is energized in response to issuance of a turn off command corresponding to the appearance of either the output signal 95 of the timing circuit 94 (indicating that the impedance inserting command has continued to subsist for at least three seconds) or the tripping signal 86 (indicating an impending internal fault in the inverter 14). When none of its thyristors is triggered, the circuit interrupter 15 is in its open circuit condition.

To close the interrupter 15, a closing command is issued to the AND component 101 which immediately produces the signal 102 and latches in as is indicated symbolically at 103 in FIG. 3B. The signal 102 unblocks the firing signal generator 81 which starts triggering the switching means 62 in series with the current limiting resistor 61 in the subsidiary circuits 60 of the three switches SWA, SWB, and SWC. Simultaneously it activates a timing circuit 104 which a short time later (e.g., 0.2 second) produces an output signal 105. The signal 105 energizes the NOT input 93a of the logic component 93 to release or unlatch the latter, whereupon the signal 91 terminates, the signal 89 reappears, and the main firing signal generator 82 is again enabled. This causes the main thyristors 51, 52 to turn on and "close" the low resistance main circuits 50 of the respective switches. At the same time, by means of a connection from the output of the timing circuit 104, through an OR circuit 106, to the NOT input 101a of the AND logic component 101, the signal 102 is discontinued, whereupon the generator 81 is deactivated and stops triggering the switching means 62. To ensure that the signal 102 will not coexist with the signal 89, the latter is also fed back through the OR circuit 106 to the NOT input 101a of the component 101. The advantages of the closing sequence outlined in this paragraph were previously explained.

While the presently preferred form of my invention has been shown and described by way of illustration, many modifications will occur to those skilled in the art. For example, the current limiting fuses 35, 36 and associated voltage sensor 37 shown in FIG. 2 could alternatively be connected between the respective pairs of inverter thyristors and the negative input terminal 14b if desired. The tripping signal T can be advantageously employed to initiate isolation of the whole inverter 14 from the D-C bus 12 by opening circuit breaker 13 or the like in response to the first commutation failure. Therefore I contemplate by the claims which conclude this specification to cover all such modifications as fall within the true spirit and scope of my invention.

What I claim as new and desire to secure by Letters Patent of the United States is:

1. Improved electric power apparatus comprising relatively positive and negative D-C input terminals adapted to be connected to a source of power, a set of A-C output conductors adapted to be connected to an electric load circuit, at least first and second complementary pairs of alternately conducting thyristors, and means including said pairs of thyristors for interconnecting said input terminals and said output conductors so that alternating voltage is developed at said output conductors when said input terminals are energized and said thyristors are turned on and off in a predetermined sequence, wherein the improvement comprises:
  (a) at least two electric fuses respectively connected in series with corresponding thyristors of said first and second pairs, each of said fuses being subject to blowing if there is abnormal overlap of the conducting periods of the respective thyristors of a pair associated therewith;
  (b) normally turned on switching means connected to said output conductors for enabling alternating current to flow between the apparatus and the load circuit, said switching means being arranged to turn off in high-speed response to a predetermined tripping signal; and
  (c) means connected to each of said fuses and responsive to a voltage increase across any one of the fuses on the occasion of its blowing for producing said tripping signal and supplying it to said switching means.

2. The apparatus of claim 1 in which said switching means comprises an inverse parallel pair of main thyristors which are normally maintained in relatively low resistance, turned on states and means activated by said tripping signal for causing whichever main thyristor is then conducting to change abruptly to a high resistance, turned off state.

3. The apparatus of claim 2 in which the last-mentioned means comprises commutating means for quenching current in the main thyristors in high-speed response to activation by said tripping signal.

4. The apparatus of claim 2 including a normally closed electromechanical circuit breaker connected in series with said switching means and equipped with means for opening the breaker in response to said tripping signal being produced.

5. The apparatus of claim 1 in which the respective thyristors of each pair are connected in series and poled in agreement with each other and each of said pairs is connected in series with its associated fuse between said input terminals, and in which said output conductors are coupled to the junctures of the thyristors of the respective pairs.

6. The apparatus of claim 5 in which the magnitude of voltage on said output conductors is controlled by varying the time interval between triggering each thyristor in one pair and turning on the thyristor that succeeds it in the complementary pair.

7. Improved electric power apparatus comprising relatively positive and negative D-C input terminals adapted to be connected to a source of power, a set of A-C output conductors adapted to be connected to an electric load circuit, a plurality of thyristors, means including said thyristors for interconnecting said input terminals and said output conductors so that alternating voltage is developed at said output conductors when said input terminals are energized and said thyristors are turned on and off in sequence, means for turning on said thyristors in a predetermined sequence, and commutating means for turning off said thyristors in a predetermined sequence, wherein the improvement comprises:
(a) normally turned on high-speed static switching means connected between the load circuit and said output conductors, and
(b) means for detecting a single commutation failure in said apparatus and for turning off said switching means, thereby isolating the apparatus from the load circuit, in high-speed response thereto.

8. The apparatus of claim 7 in which said means for interconnecting said input terminals and said output conductors includes a power transformer having primary and secondary windings, a secondary winding of said transformer being connected between output conductors, and in which said thyristors are arranged in at least first and second complementary pairs connected in a bridge configuration between said input terminals with the junctures of the thyristors of the respective pairs being spanned by a primary winding of said transformer.

9. The apparatus of claim 7 in which said means for interconnecting includes a plurality of current limiting fuses each having one terminal connected in common to a predetermined one of said input terminals, said fuses being respectively connected in series with different thyristors.

10. The apparatus of claim 9 in which a fuse is subject to blowing in the event of a single commutation failure in said apparatus, and in which said commutation failure detecting means comprises voltage sensing means connected to each of said fuses and responsive to a voltage increase across any fuse on the occasion of its blowing for initiating turn off of said switching means.

References Cited
UNITED STATES PATENTS

| | | | |
|---|---|---|---|
| 2,559,913 | 7/1951 | Foshee | 317—46 |
| 2,813,243 | 11/1957 | Christian et al. | 321—12 |
| 3,124,740 | 3/1964 | Corey et al. | 321—45 |

JAMES D. TRAMMELL, Primary Examiner

U.S. Cl. X.R.

317—26, 33, 40, 46; 321—12